United States Patent
Fukagawa et al.

(10) Patent No.: US 9,388,485 B2
(45) Date of Patent: Jul. 12, 2016

(54) THERMAL SPRAY MATERIAL AND PROCESS FOR PREPARING SAME

(71) Applicant: NIPPON YTTRIUM CO., LTD., Fukuoka (JP)

(72) Inventors: Naoki Fukagawa, Fukuoka (JP); Yuki Nakashima, Fukuoka (JP)

(73) Assignee: NIPPON YTTRIUM CO., LTD., Fukuoka (JP)

( * ) Notice: Subject to any disclaimer, the term of this patent is extended or adjusted under 35 U.S.C. 154(b) by 0 days.

(21) Appl. No.: 14/117,160

(22) PCT Filed: Apr. 12, 2013

(86) PCT No.: PCT/JP2013/061019
§ 371 (c)(1),
(2) Date: Nov. 12, 2013

(87) PCT Pub. No.: WO2014/002580
PCT Pub. Date: Jan. 3, 2014

(65) Prior Publication Data
US 2015/0096462 A1    Apr. 9, 2015

(30) Foreign Application Priority Data
Jun. 27, 2012 (JP) .................................. 2012-144462

(51) Int. Cl.
*C04B 35/50* (2006.01)
*C04B 35/505* (2006.01)
*C04B 35/553* (2006.01)
*C23C 4/10* (2016.01)
(Continued)

(52) U.S. Cl.
CPC ................ *C23C 4/10* (2013.01); *C04B 35/553* (2013.01); *C04B 35/62655* (2013.01); *C04B 35/62675* (2013.01); *C04B 35/62695* (2013.01); *C23C 4/04* (2013.01); *C23C 4/129* (2016.01); *C23C 4/134* (2016.01); *C04B 2235/3224* (2013.01); *C04B 2235/3225* (2013.01); *C04B 2235/3895* (2013.01); *C04B 2235/5436* (2013.01); *C04B 2235/6583* (2013.01); *C04B 2235/96* (2013.01)

(58) Field of Classification Search
CPC ....................... C04B 35/553; C04B 2235/3225
See application file for complete search history.

(56) References Cited

U.S. PATENT DOCUMENTS

| | | | | |
|---|---|---|---|---|
| 4,057,433 | A | * | 11/1977 | Brown .................. 106/38.3 |
| 6,039,894 | A | * | 3/2000 | Sanjurjo et al. ........ 252/301.4 R |
| 7,462,407 | B2 | * | 12/2008 | Maeda et al. .................. 428/696 |

(Continued)

FOREIGN PATENT DOCUMENTS

| JP | 2002-115040 | 4/2002 |
|---|---|---|
| JP | 2005-2410 | 1/2005 |
| JP | 2012-508684 | 4/2012 |

OTHER PUBLICATIONS

International Search Report, PCT/JP2013/061019, May 28, 2013.

*Primary Examiner* — Karl Group
(74) *Attorney, Agent, or Firm* — Young & Thompson

(57) ABSTRACT

A thermal spray material includes granules of an oxyfluoride of yttrium (YOF). The granules may contain a fluoride of yttrium ($YF_3$). The granules preferably have an oxygen content of 0.3 to 13.1 mass %. The granules preferably have a fracture strength of 0.3 MPa or more and less than 10 MPa. Part of yttrium (Y) of the granules may be displaced with at least one rare earth element (Ln) except yttrium, the molar fraction of Ln relative to the sum of Y and Ln being preferably 0.2 or less.

21 Claims, 1 Drawing Sheet

(51) Int. Cl.
*C04B 35/626* (2006.01)
*C23C 4/04* (2006.01)

(56) References Cited

U.S. PATENT DOCUMENTS

| | | | |
|---|---|---|---|
| 8,025,094 B2* | 9/2011 | Janz et al. | 164/519 |
| 8,372,769 B2* | 2/2013 | Janz et al. | 501/152 |
| 2002/0015853 A1 | 2/2002 | Wataya et al. | |
| 2002/0160189 A1 | 10/2002 | Wataya et al. | |
| 2004/0126614 A1* | 7/2004 | Maeda et al. | 428/688 |
| 2010/0129670 A1 | 5/2010 | Sun et al. | |
| 2011/0294651 A1* | 12/2011 | Janz et al. | 501/105 |
| 2014/0057078 A1* | 2/2014 | Hamaya et al. | 428/148 |
| 2015/0111037 A1* | 4/2015 | Fukagawa et al. | 428/402 |

* cited by examiner

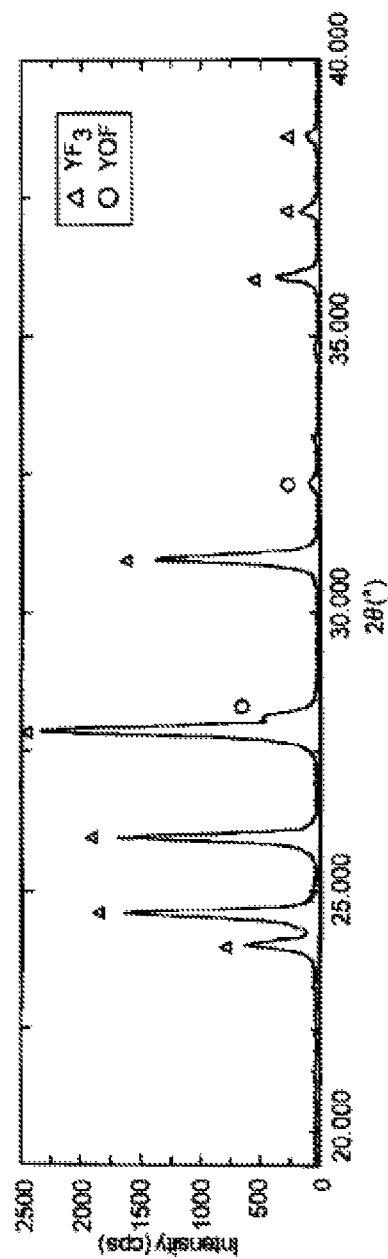

THERMAL SPRAY MATERIAL AND PROCESS FOR PREPARING SAME

TECHNICAL FIELD

This invention relates to a thermal spray material containing yttrium and a process for preparing the same.

BACKGROUND ART

A halogen gas is used in an etching step in the fabrication of semiconductor devices. In order to prevent halogen gas corrosion of an etching apparatus, the inner side of the etching apparatus is generally protected by a thermal spray coating made of a highly anti-corrosive substance. Materials containing a rare earth element are often used as one type of such substances.

Known techniques relevant to thermal spray materials containing a rare earth element include a thermal spray material comprising a granulated powder material of a fluoride of a rare earth element having an average primary particle size of 10 μm or smaller, an aspect ratio of 2 or smaller, an average particle size of 20 to 200 μm, and a degree of volume reduction of 30% or less (see Patent Literature 1). A spherically particulate thermal spray material formed of a compound containing a rare earth element including yttrium and having a fracture strength of 10 MPa or higher and an average particle size of 10 to 80 μm is also known (see Patent Literature 2).

The thermal spray material disclosed in Patent Literature 1 is produced by granulating a fluoride of a rare earth element together with a binder using a spray dryer and firing the granules at a temperature of 600° C. or lower. Patent Literature 1 says in para. [0014] that if the firing temperature exceeds 600° C., an apparent weight loss results, indicating the occurrence of decomposition by oxidation and, therefore, the firing for removing the binder should be carried out at or below 600° C. That is, Patent Literature 1 describes that the firing temperature should be 600° C. or lower so as not to cause the rare earth fluoride to oxidatively decompose to produce an oxyfluoride of the rare earth element. Although the thermal spray material disclosed in Patent Literature 1 has improved flowability compared with a non-granulated thermal spray material, the flowability cannot be said to be sufficiently satisfactory. In addition, a thermal spray coating formed by using the thermal spray material of Patent Literature 1 is, while more anti-corrosive to an F-based plasma than a conventional ceramic (e.g., alumina) thermal spray coating, low in anti-corrosion to a Cl-based plasma.

The spherically particulate thermal spray material of Patent Literature 2 is produced by granulating a slurry of fine powder of a rare earth element-containing compound using a granulator and, when the compound is an oxide, firing the granules at 1200° to 1800° C. The document, however, gives no mention of firing conditions and the like for rare earth element-containing compound other than an oxide.

CITATION LIST

Patent Literature

Patent Literature 1: JP 2002-115040A
Patent Literature 2: US 2002/0160189A1

SUMMARY OF INVENTION

Technical Problem

Accordingly, an object of the invention is to provide a thermal spray material that eliminates various disadvantages associated with the aforementioned conventional techniques.

As a result of extensive investigations, the present inventors have surprisingly found that use of an oxyfluoride of a rare earth element that is not allowed to be present in the thermal spray material of Patent Literature 1 provides thermal spray granules having markedly improved flowability and that a thermal spray coating formed by using the thermal spray granules exhibits excellent anti-corrosive properties to both F-based and Cl-based plasma and therefore achieves reduction of dust particles that come off and scatter by plasma etching. The invention has been completed based on these findings.

The invention has been accomplished based on the above findings and provides a thermal spray material including a granule containing an oxyfluoride of yttrium (YOF).

The invention also provides a suitable process for producing the thermal spray material. The process includes step 1, firing fluoride of yttrium ($YF_3$) in an oxygen-containing atmosphere at 750° to 1100° C. to obtain an oxyfluoride of yttrium (YOF);

step 2, grinding the oxyfluoride of yttrium (YOF) obtained in step 1;

step 3, mixing the ground oxyfluoride of yttrium obtained in step 2 with a solvent to prepare a slurry;

step 4, granulating the slurry obtained in step 3 using a spray dryer; and step 5; firing the granule obtained in step 4 at 300° to 900° C. to obtain granular oxyfluoride of yttrium (YOF).

BRIEF DESCRIPTION OF DRAWINGS

The drawing FIGURE is an X-ray diffraction pattern of the thermal spray material obtained in Example 4.

DESCRIPTION OF EMBODIMENTS

The invention will be described based on its preferred embodiments. The thermal spray material of the invention contains an oxyfluoride of yttrium, i.e., an yttrium oxyfluoride represented by YOF. The yttrium oxyfluoride (YOF) of the invention is a compound composed of yttrium (Y), oxygen (O), and fluorine (F). YOF includes a compound having a Y:O:F molar ratio of 1:1:1 and a compound a Y:O:F molar ratio other than 1:1:1. Examples of the compound having a Y:O:F molar ratio other than 1:1:1 include $Y_5O_4F_7$ and $Y_7O_6F_9$. YOF may be a single compound or a mixture of two or more of the above described compounds. The thermal spray material of the invention may be composed solely of YOF or may contain a substance or substances other than YOF as will be described later.

The thermal spray material of the invention comprises granules containing YOF. The thermal spray material of the invention may be composed solely of the YOF-containing granules or may contain particles having other than a granular form. The particles having other than a granular form are exemplified by primary particles resulting from partial grinding of the granules. In the case where the thermal spray material of the invention contains granules and particles having other than a granular form, the granules and the particles having other than a granular form generally have the same composition. As used herein, the term "granule(s)" is intended to denote a particle(s) preferably having an average particle size of 20 to 200 μm. The average particle size of the granules is more preferably 25 to 100 μm. When the average particle size of the granules is 20 μm or greater, the thermal spray material is efficiently supplied to a flame in thermal spraying. When the average particle size of the granules is 200 μm or smaller, the thermal spray material completely melts in a flame, thereby to form a thermal spray coating with increased surface smoothness. Granules whose average particle size falls within the range recited are obtained by appropriately selecting granulation conditions in, for example, spray drying as will be described infra.

The average particle size of the granules may be measured using, for example, a laser diffraction/scattering particle size distribution analyzer. Such an analyzer is exemplified by Microtrack HRA available from Nikkiso Co., Ltd. Prior to the measurement, a sample is dispersed in a 0.2 mass % aqueous solution of sodium hexametaphosphate in a concentration of 0.2 g/L to 2 g/L. It is advisable not to use ultrasonication to disperse the sample because ultrasonication can cause fracture of the granules. The particle size $D_{50}$ at which the cumulative volume of the particles calculated from the small diameter side reaches 50% is taken as an average particle size.

The granules may have any shape as long as their average particle size falls within the range recited above. When the granules are produced by a spray drying method as will be described later, they are generally almost spherical.

The granular thermal spray material preferably has a fracture strength of 0.3 MPa or more and less than 10 MPa, more preferably 0.5 to 9 MPa. When the granules have a fracture strength of 0.3 MPa or more, they are effectively prevented from fracture. To prevent fracture of the granules is advantageous in preventing reduction of flowability of the granules and efficiently supplying the granules into a flame. When the granules have a fracture strength of less than 10 MPa, the thermal spray material is ready to disintegrate and melt completely in a flame, thereby to increase the smoothness of the resulting thermal spray coating. Granules whose fracture strength falls within the range recited are obtained by appropriately selecting conditions of firing granules formed by, for example, spray drying as will be described infra.

The fracture strength of granules is determined in accordance with formulae (14-a) and (14-b) described in Hiraoka, Oka, and Kiyama, "Rapid Determination of the Tensile Strength of Rocks with Irregular Test Pieces", Nihon Kogyo Kaishi, vol. 81, No. 932, pp. 1024-1030 (1965-12). In detail, the determination is performed as follows. A test sieve with an aperture size of 53 µm is stacked on a test sieve with an aperture size of 45 µm. A thermal spray material is put on the upper sieve (53 µm aperture) and sieved through the stack of the sieves to harvest granules that pass through the upper sieve and do not pass through the lower sieve. The granules are used as a sample. The compressive load of the sample is measured using a micro-compression tester MCT M-500 (with a 50 µm diameter flat indenter) from Shimadzu Corp. under the conditions of a test force of 9.8 mN (1 gf) and a compression velocity of 0.446 mN/sec. The fracture strength St (MPa) of a granule is calculated from the compressive load P (N) on the sample and the particle diameter d (mm) according to formula. (1):

$$St=2.8P/(\pi d^2) \quad (1)$$

The thermal spray material of the invention may contain a fluoride of yttrium, i.e., yttrium fluoride represented by $YF_3$ in addition to YOF. Taking into consideration ability to form a uniform thermal spray coating, anticorrosion of a thermal spray coating to oxygen radicals, and the like, it is preferred that the thermal spray material be composed solely of YOF, but the presence of $YF_3$ is acceptable as long as such does not impair the effects of the invention. The $YF_3$ content in the thermal spray material is adjustable by the firing conditions in the first step in the hereinafter described process for producing the thermal spray material of the invention. It is not easy to accurately determine the fluorine content in the thermal spray material of the invention. Therefore, the inventors estimate the content of $YF_3$ from the relative intensity of the main peaks assigned to $YF_3$ with respect to the main peaks assigned to YOF in X-ray diffractometry of the thermal spray material.

Containing YOF, the thermal spray material of the invention contains oxygen. Whether or not the thermal spray material contains $YF_3$, the oxygen content in the thermal spray material is preferably in the range of from 0.3 to 13.1 mass %. With an oxygen content of 0.3 mass % or more, the thermal spray material is fed stably thereby to form a smooth thermal spray coating with ease. With an oxygen content of 13.1 mass % or less, generation of yttrium oxide, which can reduce the anti-corrosive properties of the resulting thermal spray coating, is prevented effectively, whereby reduction of the anti-corrosive properties of a thermal spray coating is prevented effectively. For these considerations, the oxygen content of the thermal spray material is more preferably 0.4 to 10.0 mass % and even more preferably 0.5 to 5.0 mass %. The oxygen content of the thermal spray material is adjustable by proper selection of the conditions of firing $YF_3$ in an oxygen-containing atmosphere in the hereinafter described process of producing for producing the thermal spray material of the invention.

The oxygen content of the thermal spray material is determined using, for example, an oxygen/nitrogen analyzer EMGA-920 from Horiba, Ltd.

While the thermal spray material may contain $YF_3$ in addition to YOF, it is preferred for the thermal spray material to contain the least amount of $Y_2O_3$, an oxide of yttrium, from the standpoint of anticorrosion properties, especially to a chlorine-containing gas, of the resulting thermal spray coating. The $Y_2O_3$ content may be minimized by properly selecting the conditions of firing $YF_3$ in an oxygen-containing atmosphere in the first step of the hereinafter described process for producing the thermal spray material of the invention.

Because it is not easy to quantitatively determine the $Y_2O_3$ content in the thermal spray material of the invention by chemical analyses, the inventors estimate the $Y_2O_3$ content from the intensity of a peak in X-ray diffractometry of the thermal spray material. In detail, the thermal spray material is analyzed by X-ray diffractometry using CuKα radiation as an X-ray source. The largest peak intensity of YOF of the diffractogram at 2θ angles of from 20° to 40° being taken as 100, the relative intensity of the largest peak assigned to $Y_2O_3$ is obtained. The relative intensity is preferably 10 or less, more preferably 5 or less, even more preferably 1 or less. The largest diffraction peak assigned to $Y_2O_3$ usually appears at a 2θ angle of around 29.1°.

Part of yttrium (Y) of the thermal spray material of the invention may be displaced with at least one rare earth element (Ln) except yttrium, thereby to enhance various characteristics of the resulting thermal spray coating, such as heat resistance, abrasion resistance, and anticorrosion properties. The rare earth element (Ln) except yttrium may be at least one element selected from Sc, La, Ce, Pr, Nd, Sm, Eu, Gd, Tb, Dy, Ho, Er, Tm, Yb, and Lu. Preferred of them is at least one element selected from samarium (Sm), gadolinium (Gd), dysprosium (Dy), erbium (Er), and Ytterbium (Yb) for obtaining enhanced heat resistance, abrasion resistance, anticorrosion properties, and the like.

When part of yttrium (Y) is displaced with a rare earth element (Ln) except yttrium, the molar fraction of Ln relative to the sum of Y and Ln in the thermal spray material is preferably 0.01 to 0.2, more preferably 0.02 to 0.1. With the molar fraction of the rare earth element (Ln) being within this range, the heat resistance, abrasion resistance, anticorrosion properties, and the like of the thermal spray coating will be further improved. Displacement of part of yttrium (Y) with a rare earth element (Ln) except yttrium is achieved by, for example, using a rare earth element fluoride in combination with yttrium fluoride in the first step of the hereinafter described process for producing the thermal spray material of the invention.

The YOF that is used in the thermal spray material of the invention has the advantage of ability to increase the fracture strength of granules as compared with a fluoride of yttrium that has been conventionally proposed as an yttrium-based thermal spray material and therefore allows the thermal spray material to be fed to a flame efficiently. Because the YOF has a lower melting point than a fluoride of yttrium, it produces the advantage of providing a more uniform thermal spray coating. Yttrium fluoride is susceptible to the attack by oxygen radicals in the plasma of a cleaning gas and liable to be converted by the attack to an oxyfluoride. As a result, the thermal spray coating tends to undergo defects, such as a crack. In contrast, YOF is less susceptible to the attack by oxygen radicals in the plasma of a cleaning gas. Therefore, the resulting thermal spray coating is less liable to develop defects and produces very few dust particles.

A suitable process for producing the thermal spray material of the invention will then be described. The process is roughly divided into the following five steps, which will be described in sequence: step 1, firing yttrium fluoride ($YF_3$) in an oxygen-containing atmosphere at 750° to 1100° C. to obtain an oxyfluoride of yttrium (YOF); step 2, grinding the oxyfluoride of yttrium (YOF) obtained in step 1; step 3, mixing the ground oxyfluoride of yttrium obtain in step 2 with a solvent to prepare a slurry; step 4, granulating the slurry from step 3 using a spray dryer; and step 5, firing the granules obtained in step 4 at 300° to 900° C. to obtain granules of an oxyfluoride of yttrium (YOF).

Step 1:

Step 1 starts with yttrium fluoride ($YF_3$), a fluoride of yttrium. A rare earth element-doped yttrium fluoride, i.e., yttrium fluoride having part of yttrium displaced with at least one rare earth element (Ln) except yttrium, may be used as well. The yttrium fluoride and the Ln-doped yttrium fluoride will hereinafter be inclusively referred to as an "yttrium fluoride compound". Yttrium and a rare earth element (Ln) except yttrium will hereinafter be inclusively referred to as "yttrium, etc.". Yttrium oxyfluoride and yttrium oxyfluoride part of yttrium of which is displaced with at least one rare earth element (Ln) except yttrium will hereinafter be inclusively referred to as an "yttrium oxyfluoride compound".

The yttrium fluoride compound can be synthesized through various methods. A wet synthesis process is preferred to obtain a uniform, high-purity product with ease. For example, the yttrium fluoride compound is synthesized by mixing a solution of an acid-soluble compound of yttrium, etc., such as an oxide, carbonate, or hydroxide of yttrium, etc., in nitric acid or hydrochloric acid or a solution of a water-soluble compound of yttrium, etc., such as a nitrate or chloride of yttrium, etc., in water or a water/acid mixed solvent with a fluorine-containing water-soluble compound, such as hydrofluoric acid or ammonium fluoride, to form a precipitate of an yttrium fluoride compound, washing the precipitate, followed by filtration, and drying the filter cake. In another method, the yttrium fluoride compound is obtained by suspending a carbonate, oxalate, hydroxide, oxide, etc. of yttrium, etc. in water, adding a fluorine-containing water-soluble compound to the resulting slurry to form a precipitate of an yttrium fluoride compound, which is then washed, filtered, and dried.

In step 1, the yttrium fluoride compound is fired to form an yttrium oxyfluoride compound (an oxyfluoride of yttrium, etc.). The degree of production of the yttrium oxyfluoride compound is adjusted appropriately by the firing conditions described below. Generally speaking, an elevated firing temperature or an extended firing time results in increase of production of the yttrium oxyfluoride compound with a reduced residue of the yttrium fluoride compound. Further elevation of the firing temperature or further extension of the firing time causes yttrium oxide or a like compound to start to be by-produced.

The temperature for firing the yttrium fluoride compound in step 1 is preferably 750° to 1100° C. At a firing temperature of 750° C. or higher, the thermal spray material will have a sufficiently high oxygen content. At a firing temperature of 1100° C. or lower, excessive formation of yttrium oxide is suppressed. Excessive formation of yttrium oxide should be avoided as much as possible so as to prevent reduction of the anticorrosion properties of a thermal spray coating. From these viewpoints, the temperature of firing the yttrium fluoride compound is more preferably 800° to 1050° C., even more preferably 850° to 1000° C.

To produce an yttrium oxyfluoride compound sufficiently and control excessive formation of yttrium oxide, the firing time is preferably 1 to 48 hours, more preferably 2 to 36 hours, provided that the firing temperature is in the above recited range.

The firing atmosphere is desirably an oxygen-containing atmosphere to form an yttrium oxyfluoride compound from an yttrium fluoride compound. Air is used as an oxygen-containing atmosphere for convenience due to the lack of the need for atmosphere adjustment.

As discussed, an yttrium oxyfluoride compound which contains or does not contain an yttrium fluoride compound is produced depending on the extent of the firing. In the following description, the term "yttrium oxyfluoride compound" will refer to an yttrium oxyfluoride compound which may contain an yttrium fluoride compound.

Step 2:

In step 2, the yttrium oxyfluoride compound obtained in step 1 is ground. The grinding may be performed in either a wet or dry mode. The grinding may be carried out in a single stage or a plurality of stages. When, in particular, the yttrium oxyfluoride compound obtained in step 1 is massive or lumpy, the grinding is preferably achieved in a plurality of stages using a grinding machine appropriate to each stage. When the grinding is conducted in a plurality of states, two-stage grinding is preferred from the standpoint of cost and labor.

In the case when step 2 is carried out by wet-grinding either directly or after dry-grinding, it is possible for the wet grinding operation to also accomplish step 3 hereinafter described. Dry grinding may be effected using various dry grinding mills, such as an attritor, a jet mill, a ball mill, a hammer mill, and a pin mill. Wet grinding may be achieved using various wet grinding mills, such as a ball mill and a bead mill.

The yttrium oxyfluoride compound is preferably ground to a $D_{50}$ of about 0.3 to 5 μm as measured using a laser diffraction/scattering particle size distribution analyzer. Grinding to such an extent results in the production of uniform granules with increased fracture strength. From this viewpoint, the $D_{50}$ is more preferably 0.5 to 3 μm.

Step 3:

In step 3, the yttrium oxyfluoride compound ground in step 2 is stirred in a solvent to make a slurry. Any solvent may be used, including water and various organic solvents. In order to successfully obtain granules by spray drying in the subsequent step, the concentration of the yttrium oxyfluoride compound in the slurry is preferably 100 to 2000 g/L, more preferably 200 to 1500 g/L. With the slurry concentration being in that range, excessive energy consumption is prevented, and the viscosity of the slurry is appropriate to stabilize spraying. While Patent Literature 1 cited supra states that addition of a binder into a slurry is essentially required, the process according to the present invention provides granules with sufficient fracture strength without using a binder. This does not mean, however, to exclude the use of a binder in the process of the invention.

Step 4:

In step 4, the slurry prepared in step 3 is granulated using a spray dryer to obtain granulates of the yttrium oxyfluoride compound. In operating a spray dryer, the atomizer is preferably rotated at a number of revolutions of 5000 to 30000 $min^{-1}$. At a number of revolutions of 5000 $min^{-1}$ or greater, the yttrium oxyfluoride compound is sufficiently dispersed in the slurry, thereby to provide uniform granules. At a number of revolutions of 30000 $min^{-1}$ or smaller, granules with a desired particle size are obtained easily. For these considerations, the number of revolutions of the atomizer is more preferably 6000 to 25000 $min^{-1}$.

In operating the spray dryer, the inlet temperature is preferably set at 150° to 300° C. At an inlet temperature of 150° C. or higher, the solid matter dries sufficiently to give granules with a reduced residual water content. At an inlet temperature of 300° C. or lower, useless energy consumption is reduced.

Step 5:

In this step, the granules obtained in step 4 are fired to afford granules of the yttrium oxyfluoride compound. The fracture strength of the resulting granules can be adjusted by the degree of firing. In detail, the firing temperature preferably ranges from 300° C. to 900° C. At a firing temperature of 300° C. or higher, the resulting granules have sufficiently high fracture strength. At a firing temperature of 900° C. or lower, the resulting granules will not have excessively high fracture strength. For these considerations, the firing temperature is more preferably 350° to 800° C., even more preferably 400° to 700° C.

The firing time is more preferably 1 to 48 hours, even more preferably 2 to 36 hours, provided that the firing temperature is in the range recited above. The firing is conveniently carried out in the atmosphere but may be effected in other environments, such as an inert atmosphere.

The thermal spray material thus obtained is suitably used in various thermal spraying techniques, such as plasma thermal spraying. Examples of substrates to be coated by thermal spraying include various metals, such as aluminum, various alloys, such as aluminum alloys, various ceramics, such as alumina, and quartz. The thermal spray material of the invention is suitable as not only a thermal spray material but also a material of ceramic parts. In some detail, the thermal spray material of the invention may be used as a raw material of ceramic parts manufactured by, for example, common pressing, cold isostatic pressing (CIP), or hot isostatic pressing (HIP) to provide ceramic parts excellent in surface smoothness and non-dustiness. Such a ceramic part is suited for use as an electronic material or a jig used in firing an electronic material.

EXAMPLES

The invention will now be illustrated in greater detail with reference to Examples, but it should be understood that the invention is not deemed to be limited thereto. Unless otherwise noted, all the percents are by mass.

Example 1

A thermal spray material consisting of YOF and $YF_3$ was produced according to the following procedures (a) through (d).

(a): Step 1

(a-1) Wet Synthesis of Yttrium Fluoride

In 400 L of pure water being stirred was poured 300 kg of 99.9% yttrium oxide to prepare a slurry. To the slurry was added 550 L of a 15 mol/L aqueous solution of nitric acid at a rate of 5 L/min, and the stirring was further continued for an additional period of 30 minutes. The slurry was filtered in vacuo to give 1100 L of a solution containing 270 g (in terms of $Y_2O_3$) of a solute per liter.

To the solution being stirred was added 300 L of 50% hydrofluoric acid at a rate of 5 L/min to form a precipitate of yttrium fluoride. Sedimentation of the precipitate, removal of the supernatant, addition of pure water, and repulping were conducted twice, followed by sedimentation, and followed by removal of the supernatant. The resulting wet solid was placed in a polytetrafluoroethylene tray and dried at 150° C. for 48 hours. The dried solid was ground to give yttrium fluoride. An X-ray diffractogram of the thus obtained yttrium fluoride showed only the diffraction peaks assigned to $YF_3$ with no peaks of yttrium oxyfluoride (YOF).

(a-2) Firing of Yttrium Fluoride

The yttrium fluoride obtained in (a-1) was put in an alumina container and fired in the atmosphere in an electric oven at the firing temperature for the firing time shown in Table 1 below.

(b): Steps 2 and 3

The fired product obtained in step 1 was put in a bead mill together with pure water and wet-ground to a $D_{50}$ of 1.0 to 2.0 µm measured with Microtrack HRA. An additional amount of pure water was added to the ground product to give a slurry having a concentration of 500 g/L.

(c): Step 4

The slurry obtained in step 3 was granulated and dried using a spray dryer from Ohkawara Kakohki Co., Ltd. under the following conditions:

Feed rate of slurry: 300 ml/min

Number of revolutions of atomizer: 9000 $min^{-1}$

Inlet temperature: 200° C.

(d): Step 5

The granules obtained in step 4 were put in an alumina container and fired in the atmosphere in an electric oven at 600° C. for 12 hours to obtain granules. The average particle size $D_{50}$ of the resulting granules was found to be about 50 µm as determined by the method described supra. The $D_{50}$ values of the granules obtained in the following Examples and Comparative Examples were substantially equal to that value. The granules were almost spherical. There was thus obtained a desired thermal spray material.

Examples 2 to 11 and Comparative Example 1

A thermal spray material was obtained in the same manner as in Example 1, except for altering the conditions of firing yttrium fluoride in step 1 as shown in Table 1.

Comparative Example 2

An yttrium oxide thermal spray material was prepared by starting with commercially available yttrium oxide. The yttrium oxide was subjected to the same procedures of steps 2 through 4 of Example 1. The product from step 4 was processed according to the same procedure of step 5 of Example 1, except for changing the firing temperature to 1300° C.

TABLE 1

| | Step 1 Firing Conditions | |
| --- | --- | --- |
| | Temperature (° C.) | Time (hr) |
| Example 1 | 750 | 12 |
| Example 2 | 800 | |
| Example 3 | 850 | |
| Example 4 | 900 | |
| Example 5 | 950 | |
| Example 6 | 1000 | |
| Example 7 | 1050 | |
| Example 8 | 1075 | |
| Example 9 | 1100 | |
| Example 10 | 1125 | |
| Example 11 | 1125 | 24 |
| Comparative Example 1 | 700 | 12 |
| Comparative Example 1 | Commercial product | |

Example 12

Example 12 demonstrates the production of a thermal spray material having part of yttrium displaced with a rare earth element (Ln) except yttrium.

(a): Step 1
(a-1) Wet Synthesis of Yttrium Samarium Fluoride

A mixture of yttrium oxide and samarium oxide was used in place of the yttrium oxide used in step 1 of Example 1. The mixing ratio of the two was as shown in Table 2. The mixture was poured into 40 L of pure water being stirred to prepare a slurry. To the slurry was added 55 L of a 15 mol/L aqueous solution of nitric acid at a rate of 5 L/min, and the stirring was continued for an additional period of 30 minutes. To the resulting solution being stirred was added 30 L of 50% hydrofluoric acid at a rate of 5 L/min to form a precipitate. Sedimentation of the precipitate, removal of the supernatant, addition of pure water, and repulping were conducted twice, followed by sedimentation, and followed by removal of the supernatant. The resulting wet solid was placed in a polytetrafluoroethylene tray and dried at 150° C. for 48 hours. The dried solid was ground to give yttrium samarium fluoride.

(a-2) Firing of Yttrium Samarium Fluoride

The fluoride obtained in (a-1) was put in an alumina container and fired in the atmosphere in an electric oven at 900° C. for 12 hours.

(b): Steps 2 to 5

Steps 2 to 5 were carried out in the same manner as in Example 1 to yield a desired thermal spray material.

Examples 13 to 16

Examples 13 to 16 demonstrate the production of thermal spray materials in which part of yttrium is displaced with a rare earth element (Ln) except yttrium similarly to Example 12. A desired thermal spray material was produced in the same manner as in Example 12, except for replacing samarium used in step 1 with the rare earth element oxide shown in Table 2 in the mixing ratio shown.

TABLE 2

| | Rare earth element Ln | $Ln_2O_3$ (kg) | $Y_2O_3$ (kg) | Ln molar fraction (%) |
| --- | --- | --- | --- | --- |
| Example 12 | Sm | 4.63 | 27 | 0.1 |
| Example 13 | Gd | 4.82 | 27 | 0.1 |
| Example 14 | Dy | 4.96 | 27 | 0.1 |
| Example 15 | Er | 5.08 | 27 | 0.1 |
| Example 16 | Yb | 5.24 | 27 | 0.1 |

Evaluation:

The thermal spray materials obtained in Examples and Comparative Examples were evaluated for granule fracture strength and oxygen content by the methods described supra. The thermal spray materials were analyzed by X-ray diffractometry, and the relative intensity of main peaks of each of $YF_3$, YFO, and $Y_2O_3$ was calculated from the diffraction pattern. As a representative, the X-ray diffraction pattern of the thermal spray material of Example 4 is shown in FIG. 1. The surface roughness of a thermal spray coating formed of each thermal spray material was measured by the method described below. The flowability of the granules in thermal spraying was evaluated, and the number of dust particles generated was measured by the respective methods described below. The results obtained are shown in Table 3.

(1) X-Ray Diffractometry
Apparatus: Ultima IV (from Rigaku Corp.)
Ray source: CuKα radiation
Tube voltage: 40 kV
Tube current: 40 mA
Scan rate: 2°/min
Step: 0.02°
Scan range: 2θ=20° to 40°

(2) Surface Roughness of Thermal Spray Coating

A 100 mm square aluminum alloy plate was prepared as a substrate. The substrate was coated by plasma thermal spraying using a powder feeder Twin-System 10-V (from Plasma-Technik AG) as an apparatus for supplying the thermal spray material and an F4 plasma spray gun (from Sulzer Metco) as an apparatus for plasma thermal spraying. The plasma thermal spraying was carried out using $Ar/H_2$ as plasma gases at a number of resolutions of the disk of 50%, a carrier gas flow rate of 2.5 L/min, a feed scale of 10%, an output power of 35 kW, and an apparatus-substrate spacing of 150 mm to a coating thickness of about 100 μm. The arithmetic average roughness Ra and maximum height Rz (both specified by JIS B0601:2001) of the surface of the resulting thermal spray coating were measured using a stylus profilometer (specified by JIS B0651:2001).

(3) Flowability of Granules being Fed in Thermal Spraying

During the plasma thermal spraying in the evaluation of surface smoothness of thermal spray coating, flowability of the granules being fed to the powder feeder was observed with the naked eye and rated as follows.

Very good: The granules flow uniformly with no pulsation.
Good: The flow of granules involves a slight pulsation which is practically non-problematic.
Bad: The flow of granules involves a great pulsation which, in some cases, raises the need to clean the feeder.

(4) Number of Dust Particles

A thermal spray coating formed on a 100 mm square aluminum alloy plate by plasma spraying was plasma etched in a chamber in which a 3 inch silicon wafer was placed beforehand. Of the particles having scattered and adhered to the surface of the silicon wafer, those having a particle size greater than about 0.2 μm were counted using a magnifier. The plasma etching was carried out using an F-based plasma under the following conditions.

Atmospheric gas: $CHF_3:Ar:O_2$=80:160:100 (ml/min)
High frequency power: 1300 W Pressure: 4 Pa Temperature: 60° C.

Etching time: 20 hours

Furthermore, the particle measurement was taken in the same manner, except for replacing $CHF_3$ of the atmospheric gas to HCl to generate a Cl-based plasma.

TABLE 3

| | Granule | | | | | Thermal spray | | | | |
|---|---|---|---|---|---|---|---|---|---|---|
| | Relative intensity of peak in X-ray diffractometry | | | Fracture strength | Oxygen content | Flowability of granules | Surface roughness (μm) | | Number of dust particles | |
| | $YF_3$ | YOF | $Y_2O_3$ | (MPa) | (% by mass) | being fed | Ra | Rz | F-based plasma | Cl-based plasma |
| Example 1 | 100 | 1 | 0 | 0.3 | 0.3 | Good | 8.2 | 76 | 19 | 25 |
| Example 2 | 100 | 2 | 0 | 0.5 | 0.4 | Good | 6.5 | 63 | 15 | 14 |
| Example 3 | 100 | 4 | 0 | 1.0 | 0.5 | Very good | 4.8 | 50 | 7 | 6 |
| Example 4 | 100 | 6 | 0 | 1.6 | 0.8 | Very good | 4.5 | 47 | 4 | 2 |
| Example 5 | 100 | 11 | 0 | 2.0 | 1.4 | Very good | 4.5 | 43 | 3 | 2 |
| Example 6 | 100 | 30 | 0 | 3.3 | 3.1 | Very good | 4.3 | 38 | 2 | 3 |
| Example 7 | 100 | 39 | 0 | 5.5 | 3.8 | Very good | 4.5 | 44 | 5 | 4 |
| Example 8 | 100 | 65 | 0 | 7.7 | 5.0 | Very good | 4.8 | 45 | 10 | 7 |
| Example 9 | 32 | 100 | 0 | 8.5 | 9.8 | Very good | 5.0 | 48 | 12 | 8 |
| Example 10 | 1 | 100 | 1 | 9.9 | 12.9 | Very good | 4.7 | 46 | 15 | 10 |
| Example 11 | 0 | 100 | 4 | 10.8 | 13.2 | Very good | 4.9 | 49 | 24 | 22 |
| Compara. Example 1 | 100 | 0 | 0 | 0.2 | 0.2 | Bad | 25 | 210 | >100 | >100 |
| Compara. Example 1 | 0 | 0 | 100 | 15.2 | — | Good | 7.3 | 82 | 25 | >100 |
| Example 12 | 100 | 6 | 0 | 1.8 | 0.7 | Very good | 4.7 | 43 | 2 | 2 |
| Example 13 | 100 | 6 | 0 | 1.7 | 0.7 | Very good | 4.4 | 40 | 2 | 2 |
| Example 14 | 100 | 5 | 0 | 2.0 | 0.6 | Very good | 4.5 | 39 | 2 | 2 |
| Example 15 | 100 | 5 | 0 | 2.1 | 0.6 | Very good | 4.3 | 43 | 1 | 1 |
| Example 16 | 100 | 5 | 0 | 2.3 | 0.6 | Very good | 4.1 | 37 | 0 | 0 |

As is clear from the data of Examples 1 through 11 given in Table 3, the production of yttrium oxyfluoride increases with the firing temperature of yttrium fluoride in step 1. It is seen from the comparison between Examples 10 and 11 that, at a firing temperature fixed at 1125° C. in step 1, yttrium fluoride remains after 12-hour firing but disappears after 24-hour firing.

As is apparent from the results in Table 3, the thermal spray material of every Example has higher fracture strength than that of Comparative Example. It is also seen that the thermal spray material of every Example has higher flowability than that of Comparative Example and is capable of forming a thermal spray coating with a reduced surface roughness. It is also seen that the thermal spray coating formed of the thermal spray material of every Example generates fewer dust particles than those formed of the thermal spray materials of Comparative Examples. That is, the thermal spray coatings formed of the thermal spray materials of Examples prove excellent in anti-corrosion properties against not only an F-based plasma but also a Cl-based plasma.

INDUSTRIAL APPLICABILITY

The thermal spray material of the invention has higher granule fracture strength and improved flowability than a thermal spray material using a fluoride of yttrium. The thermal spray material of the invention has a lower melting temperature than a thermal spray material using a fluoride of yttrium. Therefore, it is easier with the thermal spray material of the invention to provide a uniform thermal spray coating than with a thermal spray material using a fluoride of yttrium. Furthermore, the thermal spray coating formed of the thermal spray material of the invention is less likely to develop a defect, such as a crack.

The invention claimed is:

1. A thermal spray material, comprising:
   a granule containing an oxyfluoride of yttrium (YOF), wherein
   the granule is a granulated material formed by granulating particles containing oxyfluoride of yttrium and having $D_{50}$ of about 0.3 to 5 μm as measured using a laser diffraction/scattering particle size distribution analyzer, and the granule has an average particle size of 20 to 200 μm.

2. The thermal spray material according to claim 1, wherein the granule further contains a fluoride of yttrium ($YF_3$).

3. The thermal spray material according to claim 1, wherein the granule has a total oxygen content of 0.3% to 13.1% by mass.

4. The thermal spray material according to claim 1, having a fracture strength of 0.3 MPa or more and less than 10 MPa.

5. The thermal spray material according to claim 1, wherein part of yttrium (Y) is displaced with at least one rare earth element (Ln) except yttrium, the molar fraction of Ln relative to the sum of Y and Ln being 0.2 or less.

6. The thermal spray material according to claim 1, wherein the rare earth element (Ln) except yttrium is at least one member selected from the group consisting of samarium (Sm), gadolinium (Gd), dysprosium (Dy), erbium (Er), and Ytterbium (Yb).

7. A process for producing the thermal spray material according to claim 1, comprising:
   step 1, firing fluoride of yttrium ($YF_3$) in an oxygen-containing atmosphere at 750° to 1100° C. to obtain an oxyfluoride of yttrium (YOF);
   step 2, grinding the oxyfluoride of yttrium (YOF) obtained in step 1;
   step 3, mixing the ground oxyfluoride of yttrium obtained in step 2 with a solvent to prepare a slurry;
   step 4, granulating the slurry obtained in step 3 using a spray dryer; and
   step 5; firing the granule obtained in step 4 at 300° to 900° C. to obtain granular oxyfluoride of yttrium (YOF).

8. The process according to claim 7, wherein the fluoride of yttrium ($YF_3$) used in step 1 is obtained by wet synthesis.

9. The process according to claim 7, wherein the oxygen-containing atmosphere is air.

10. The process according to claim 7, wherein the oxyfluoride of yttrium (YOF) obtained in step 1 is subjected, either directly or after dry-grinding, to wet-grinding in step 2 to obtain a slurry of the oxyfluoride of yttrium (YOF).

11. The process according to claim 7, wherein in step 1 the fluoride of yttrium ($YF_3$) is fired to obtain an oxyfluoride of yttrium (YOF) containing yttrium fluoride ($YF_3$).

12. The process according to claim 7, wherein the fluoride of yttrium ($YF_3$) used in step 1 has part of yttrium (Y) displaced with at least one rare earth element (Ln) except yttrium.

13. The process according to claim 12, wherein the rare earth element (Ln) except yttrium is at least one member selected from samarium (Sm), gadolinium (Gd), dysprosium (Dy), erbium (Er), and Ytterbium (Yb).

14. The thermal spray material according to claim 2, wherein the granule has a total oxygen content of 0.3% to 13.1% by mass.

15. The thermal spray material according to claim 2, having a fracture strength of 0.3 MPa or more and less than 10 MPa.

16. The thermal spray material according to claim 3, having a fracture strength of 0.3 MPa or more and less than 10 MPa.

17. The thermal spray material according to claim 2, wherein part of yttrium (Y) is displaced with at least one rare earth element (Ln) except yttrium, the molar fraction of Ln relative to the sum of Y and Ln being 0.2 or less.

18. The thermal spray material according to claim 3, wherein part of yttrium (Y) is displaced with at least one rare earth element (Ln) except yttrium, the molar fraction of Ln relative to the sum of Y and Ln being 0.2 or less.

19. The thermal spray material according to claim 4, wherein part of yttrium (Y) is displaced with at least one rare earth element (Ln) except yttrium, the molar fraction of Ln relative to the sum of Y and Ln being 0.2 or less.

20. The thermal spray material according to claim 2, further comprising at least one rare earth element (Ln) except yttrium, which is at least one member selected from the group consisting of samarium (Sm), gadolinium (Gd), dysprosium (Dy), erbium (Er), and Ytterbium (Yb).

21. The thermal spray material according to claim 2, wherein an x-ray diffraction pattern of the thermal spray material has a YF3 peak at 28 2θ(o) with an intensity of 2250 cps, said YF3 peak having a YOF shoulder with an intensity of 500 cps.

* * * * *